United States Patent
Brotz

Patent Number: 5,248,462
Date of Patent: Sep. 28, 1993

[54] PROCESS FOR MAKING SILICON CARBIDE FOAM

[76] Inventor: Gregory R. Brotz, P.O. Box 1322, Sheboygan, Wis. 53081

[21] Appl. No.: 719,395

[22] Filed: Jun. 24, 1991

Related U.S. Application Data

[63] Continuation-in-part of Ser. No. 460,801, Jan. 4, 1990, abandoned.

[51] Int. Cl.⁵ .............................. B29C 65/00; B28B 1/08; B29D 7/00
[52] U.S. Cl. .......................................... 264/42; 264/70; 264/166; 264/212; 264/219; 264/317
[58] Field of Search ............... 264/44, 63, 166, 212, 264/214, 70, 71, 43, 42, 219, 317; 501/80

[56] References Cited

U.S. PATENT DOCUMENTS

| | | | |
|---|---|---|---|
| 4,513,030 | 4/1985 | Milewski | 501/88 |
| 4,777,153 | 10/1988 | Sonuparlak | 264/44 |
| 5,028,036 | 7/1991 | Sane et al. | 210/510.1 |

Primary Examiner—Jeffery Thurlow
Assistant Examiner—Christopher A. Fiorilla
Attorney, Agent, or Firm—William Nitkin

[57] ABSTRACT

A process for making a silicon carbide foam structural material utilizing continuous and non-continuous processes where bead members are mixed with silicon powder-carbon powder and molded into a shape. The bead members are then removed by melting. The remaining silicon powder-carbon powder structure, having been formed with a plurality of apertures therein from where the beads have been removed, is further heated to a point sufficient to form a silicon carbide structure retaining such plurality of apertures to create a silicon carbide foam.

2 Claims, 3 Drawing Sheets

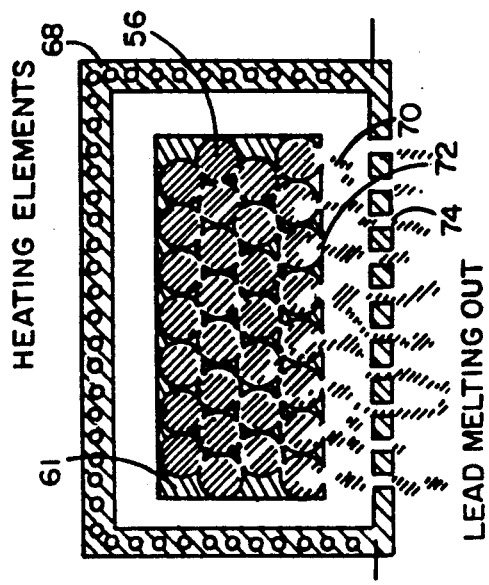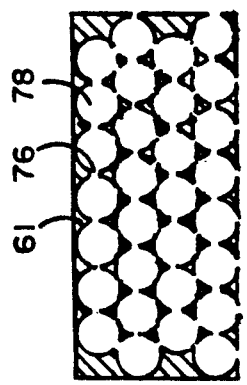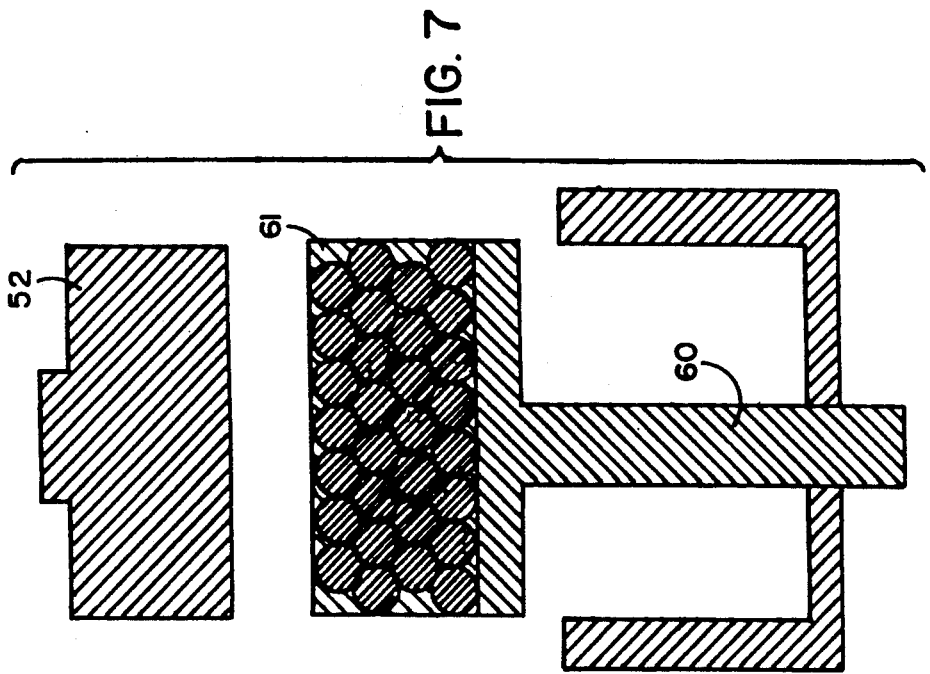

PROCESS FOR MAKING SILICON CARBIDE FOAM

This application is a continuation-in-part of my previous application under the same title, Ser. No. 460,801 filed Jan. 4, 1990, now abandoned.

BACKGROUND OF THE INVENTION

1. Field of the Invention

The process of this invention resides in the area of production of silicon carbide foam and more particularly relates to a method for production of silicon carbide foam using bead-like material to form the cells of the foam and removing such bead-like material during the foam's formation.

2. Description of the Prior Art

Silicon carbide is a very strong crystalline structure having high thermal conductivity and resistance to fluxing, fusion and oxidation. It can, in some instances, be utilized as an electrical insulator but as it heats, it becomes more conductive. At 2000 degrees F. it is as conductive as graphite and is therefore classed as a semi-conductor which has many uses. Early production of silicon carbide was accomplished by heating a mixture of clay and coke in an iron bowl with a carbon arc lamp. The hexagonal crystals which attached to the carbon electrode were formed of silicon carbide. Since these crystals have the approximate hardness of diamonds, they are frequently utilized as an abrasive in industry. Today's methods of production of silicon carbide are basically the same as the historical methods. The major difference is in the size of the furnace and control of the ingredients. A furnace run will take about 36 hours during which the temperature can vary from 4,000–5,000 degrees F. in the core, dropping to about 2,500 degrees F. at the outer edge. These furnaces are usually in the shape of large troughs with electrodes at either end. The energy consumed can exceed 100,000 kilowatt hours per run. Furnaces are about 40 ft. long, 10 ft. high and 10 ft. wide and can produce about 25,000 lbs of silicon carbide per run. Silicon carbide can also be used to produce strong, lightweight members for the aerospace industry such as girders and is further useful in electro-chemical processing machinery where it is desired to have non-conductive members.

A type of foamed silicon carbide material is disclosed in U.S. Pat. No. 4,777,153 to Sonuparlak et al. Sonuparlak et al discloses a very small celled foam made from microspheres with very weak structural integrity due to its very thin cell walls. The strength of a porous structure ordinarily decreases with increased porosity. However in some cases the strength does not decrease with increasing porosity if the structure has a dense surface. Sonuparlak et al gives his structure a dense surface by slip casting or tape casting so as to add dense layers to his structure.

SUMMARY OF THE INVENTION

The basic process of this invention forms a silicon carbide foam for the production in one embodiment of architectural beams, sheets or structural members for the building of various structures. A conveyor molding belt is provided and lead shot, for example, or other bead-like material is entered into such molding belt. The molding belt can be selected from a variety of belt shapes. The lead shot is then passed under a delivery tube depositing a finely divided mixture of carbon powder, silicon powder, and a binder on the lead shot. The powdered mixture fills in the spaces between the lead shot and forms around such shot. The mixture in the mold then passes under a molding roller which compresses the mixture into the mold's cavities. This compression in the mold helps yield a structure with a dense surface by this simple and economical step without the need of otherwise separately creating a dense surface. The applied pressure makes the surfaces of the instant invention dense whereby maintaining the strength of the structure with increased porosity without the need to add layers on the outside which feature is an improvement over the prior art. Further, by the use of large-diameter bead-like materials the cell walls of the final product are thicker and stronger than those of the prior art, further contributing to the strength of the foam structure. Each shot or bead-like member is surrounded by the silicon powder and the carbon powder mixture. The molded mixture is then passed out of the conveyor molding belt in its compressed form into a deleading furnace where it passes by a heating coil. The lead, having a much lower melting temperature than the silicon or carbon, is melted out of the spaces where it resides within the compressed mass, and the molten lead is forced out of the structure by an air flow, leaving a series of open cells. The molten lead is collected and directed to a tower to form more lead shot in the traditional manner. The carbon, silicon and binder structure with all its cavities is then passed through a heating chamber where it is heated until the silicon and carbon fuse to become a silicon carbide foam. The silicon carbide foam can then be cut off at various lengths. In some instances other bead-like members can be utilized in place of lead shot as will be described further below.

Silicon carbide foamed structural members can also be made by a non-continuous process which includes placing lead or other types of bead-like members into molds with silicon powder and carbon powder and compacting the contents. The beads are then melted out, leaving their empty cells behind and the structure is heated to form the silicon carbide foam.

BRIEF DESCRIPTION OF THE DRAWINGS

FIG. 7 illustrates the silicon powder, carbon powder and bead structure being lifted out of the mold.

FIG. 8 illustrates the silicon powder, carbon powder and bead-like mass being baked in an oven to melt the bead-like members for their removal therefrom.

FIG. 9 illustrates a cross-section of silicon carbide foam.

DESCRIPTION OF THE PREFERRED EMBODIMENT(S)

Figure 1:
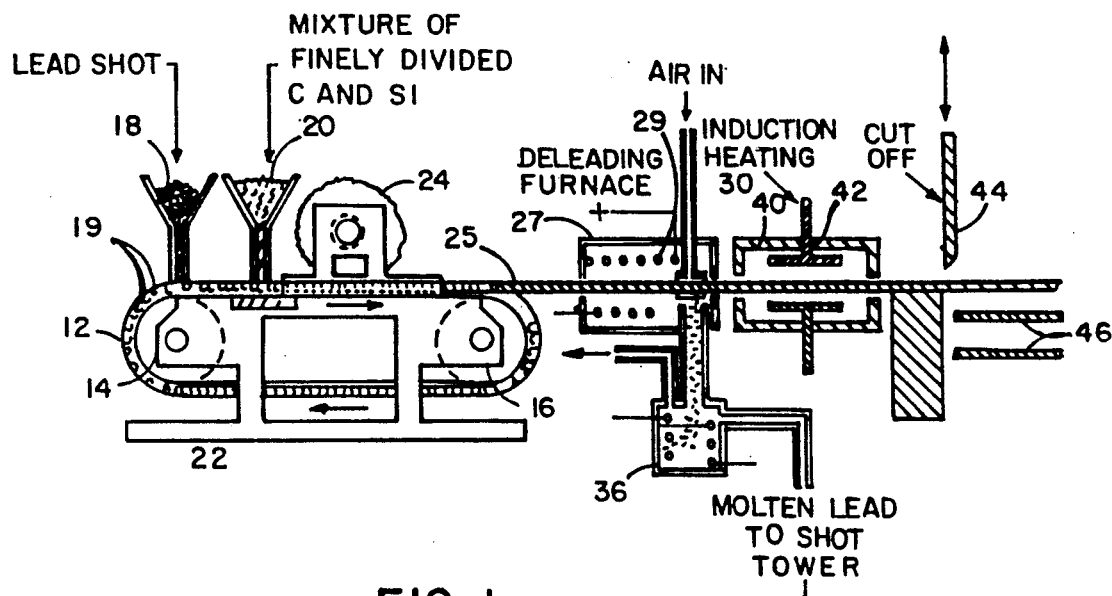
FIG. 1 illustrates a side view of a machine for operation of the continuous process of making silicon carbide foam of this invention.
Figure 2:
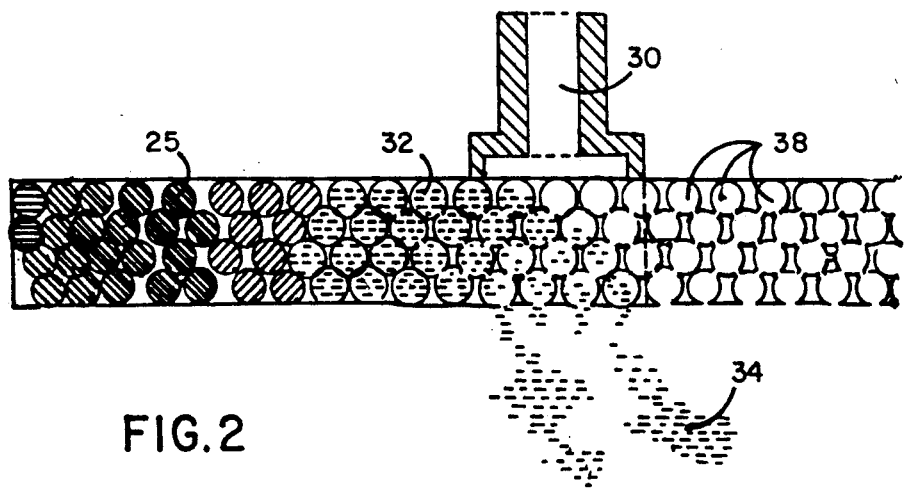
FIG. 2 illustrates the melting of the bead-like material within the compressed mass and the removal of the bead material therefrom by air flow, leaving the molding of the mixture of silicon powder and carbon powder.

FIG. 1 illustrates the process of this invention for making continuous-length silicon carbide foamed structural members. Seen in this view is molding belt 12 which rotates continuously on wheels 14 and 16 and which can have various mold shapes formed within its mold blocks 19 or which can be flat to accommodate a rod or sheet. Lead shot 18 which can be 1-10 mm in diameter or other bead-like material as will be described below can be entered onto molding belt 12 which belt 12 can then move forward to where entry tube 20 delivers a mixture of finely divided carbon powder, silicon powder and a binder over the shot. Some prior art silicon carbide foams are made with microsphere-size beads but for architectural-strength beams or sheets the larger size beads of the process of this invention must be used. By the use of large bead material denser cell walls are obtained for greater strength. Vibrator 22 vibrates the shot to be in contact with one another and to mix the finely divided mixture of carbon powder and silicon powder in the interstices between the bead-like material. The carbon powder and silicon powder also contain a binding material to help retain the integrity of the combined mass together while it is being processed, such binding material being water or other fluid to help hold the particles, once they have been vibrated, into the chosen shape, forming a solidified slurry after compression in the interstices between the bead-like material. The molded mass then passes under molding wheel 24 which compresses it tightly in the mold so that the bead-like material members contact one another. When the bead-like material is removed, as described below, open cells are formed which cells are open from one to the other where the contact of one bead-like member to another was made. Molded structure 25 passes off the end of molding belt 12 as the belt passes around wheel 16 to return again to its original position for further receipt of the bead-like material, carbon powder and silicon powder mixture. Molded structure or molding 25 passes into deleading furnace 27 which has coils 29 around molding 25 at a temperature sufficient to melt the lead shot or bead-like material which material which is held in contact with one another in the silicon powder-carbon powder mixture. Air tube 30 then directs a strong flow of air against molding 25 and, as seen in FIG. 2, forces air through molding 25 wherein melted bead-like material or shot 32 is blown from within the molding as it is then a melted fluid 34 which fluid falls into heated container 36 where it can be directed to a shot tower for reformation into shot for reuse. Molding 25, as seen in FIG. 2 after removal of the shot, has a plurality of cavities 38 forming open cells within the silicon powder-carbon powder-binder molding. This molding is then passed into heating chamber 40 which has a high-temperature heater 42 of sufficient temperature to fuse the carbon and silicon in the structure to form a silicon carbide which then passes out of heater 42 to be processed further such as being cut into beams or sheets by, for example, a cutoff knife 44 to yield silicon carbide members 46. In this way a useful silicon carbide foam structural member can be produced.

In another embodiment of the same process foamed polystyrene beads of low carbon residue or other type of low carbon residue plastic beads can be utilized instead of lead shot as the bead-like material. The silicon powder-carbon powder mixture should be a one-to-one molecular ratio of carbon and silicon in a powdered form with a fluid binder forming an initial slurry which can be forced into the interstices between the beads or shot. The binder then solidifies the slurry around the beads or shot after the vibrating and compressing steps. The molding is heated in the deleading furnace and the binder is further set, firmly holding the structure together. It is then fired in the high-temperature heating chamber to form the silicon carbide foam. In some cases the binder can contribute to the carbon content and if this is the case, then that amount of residual carbon should be subtracted from the amount of initial carbon powder mixed with the silicon powder in the slurry. An example of such a mixture can be:

1 molar gram weight of carbon powder
0.8 molar gram weight of silicon powder
5% of the carbon and silicon by weight of phenolic resin binder The slurry medium can also include ethanol or methanol to help make a pourable mixture as long as there is a balancing of molar gram weights of the carbon and silicon so that neither one will be present in a greater total molecular amount than the other.

Figure 3:
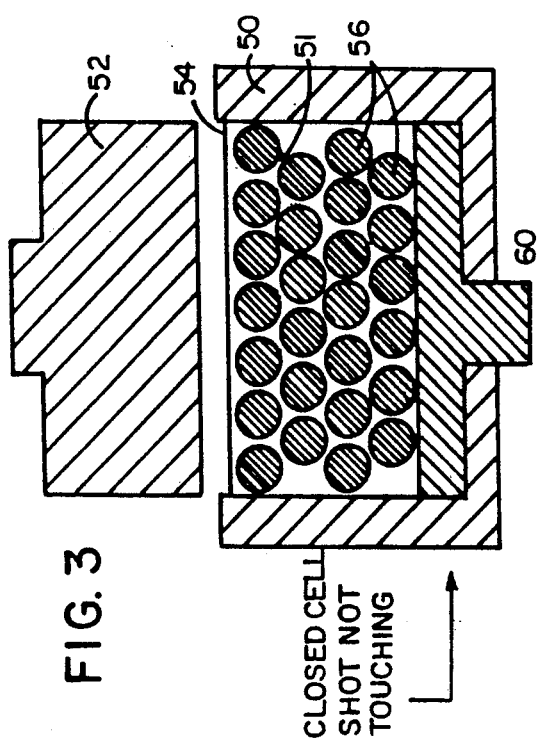
FIG. 3 illustrates a mold used in the non-continuous process for producing silicon carbide foam.

FIG. 3 illustrates a non-continuous process for producing a silicon carbide foamed structural member. In this figure, one can see mold 50 with lift member 60 positioned at the bottom thereof adapted, as will be described below, to lift the contents of mold 50 upward and outward therefrom. Pressure plate 52 is adapted to move downward on the top of the contents within mold 50 to compress and compact the contents under great force. In mold 50 one can see the silicon powder-carbon powder mixture 54 which in certain instances will not need a binder when used in the non-continuous process because the pressure from compacting the mixture is sufficient to hold the particles together in a compressed mass. Beads 56 are seen having the silicon powder-carbon powder mixture between each bead such as in area 51 so that the beads are separated from contact with one another.

Figure 4:
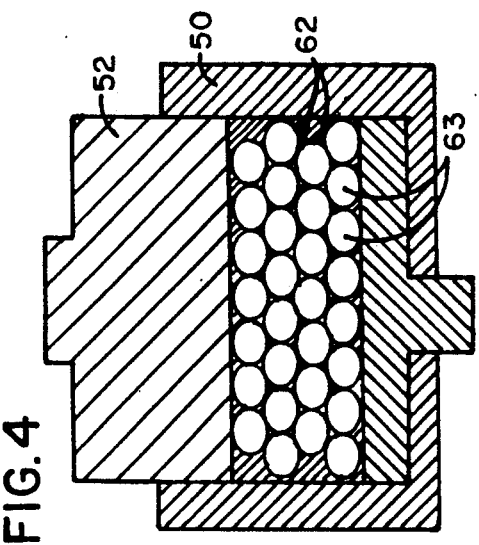
FIG. 4 illustrates the mold of FIG. 3 with the top member compressing the mold's contents.

FIG. 4 illustrates the mold of FIG. 3 where top member 52 has moved down upon the top of the silicon powder-carbon powder-bead mixture, compressing the mass together where the beads as denoted by numeral 63 are deformed from the compression of top 52 pressing in the mass. Located between each bead in areas 62 is the silicon powder-carbon powder mixture.

Figure 6:
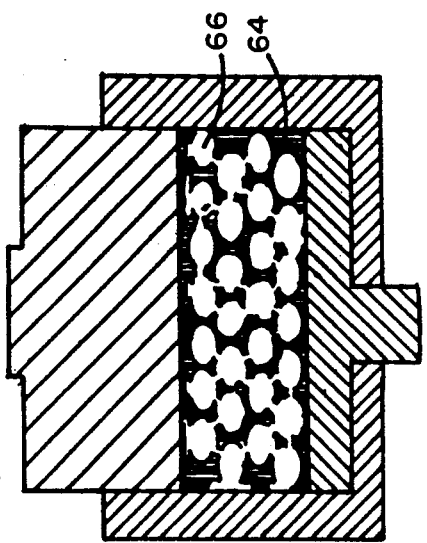
FIG. 6 illustrates the mold of FIG. 5 under pressure from the top member.
Figure 5:
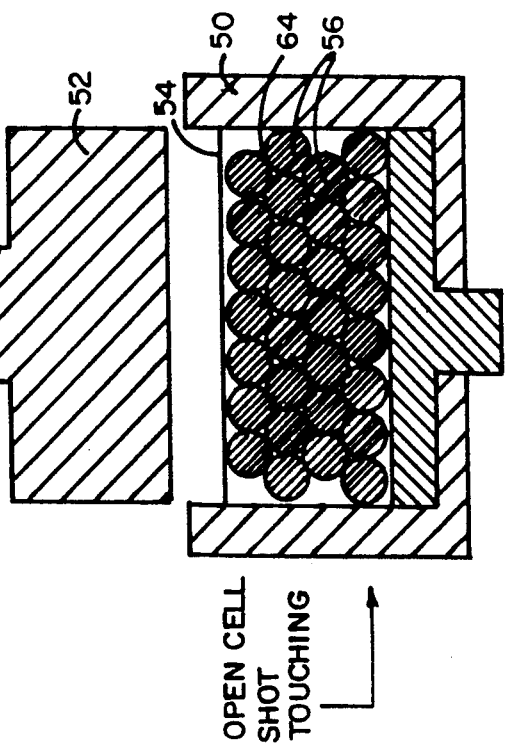
FIG. 5 illustrates a mold containing bead-like members which are in contact with one another.

FIG. 5 illustrates an alternate process from that illustrated in FIG. 3 with the same type of mold but with beads 56 being in contact with one another within the silicon powder-carbon powder mixture 54. As can be seen at point 64, the beads contact one another and as such, when, as seen in FIG. 6, compression occurs, the beads being in contact with one another have contacting areas 64 between the various bead areas 66. If sufficient force is applied as seen in this view, the bead material can liquify due to the extreme high pressure which tends to force the contact areas between the beads to become even greater. As can be seen in FIGS. 4 and 6, the beads will deform and compress and can merge and even melt together from the extreme force applied.

FIG. 7 illustrates the structure that is produced from either the mold arrangement of FIG. 3 or FIG. 5 being lifted out of mold 50 by member 60 when top member 52 has been lifted out of the mold. This lifting raises the mass of beads and silicon powder-carbon powder out of the mold and the mass retains its shape because of the great compression that it was under. Structure 61 is then placed within furnace 68 which starts heating with sufficient temperature to liquify bead members 56 and to cause the bead member contents to pour through apertures formed in structure 61 so that the liquified bead contents, whether it be lead or other materials as discussed above, pour out through the apertures such as aperture 72 formed in the mass into the bottom of the oven and out apertures 74 in the oven to collecting areas not shown. The materials of the beads also through vaporization and outgassing will eventually be vaporized or liquified to such an extent that they will leave the remaining cellular structure of the compressed silicon powder-carbon powder mixture which mass is continued to be heated with open cells 78 formed therein as seen in FIG. 9 leaving a silicon carbide foam.

Although the present invention has been described with reference to particular embodiments, it will be apparent to those skilled in the art that variations and modifications can be substituted therefor without departing from the principles and spirit of the invention.

I claim:

1. A continuous process for producing an open-cellular silicon carbide foam architectural beam, sheet or structural member comprising the steps of:

providing a continuous molding belt of a selected configuration;

depositing in said molding belt a plurality of bead-like members of a diameter selected in the range of 1–10 mm;

mixing carbon powder, silicon powder and a binder to form a slurry;

depositing said slurry on said bead-like members;

vibrating said molding belt containing said bead-like members and slurry;

surrounding said bead-like members in said molding belt with said slurry;

compressing said bead-like members and slurry under a compression roller;

forming a solidified molding by said compressing of said bead-like members and slurry mixture with said bead-like members in contact with one another;

passing said molding into a furnace;

heating said molding in said furnace;

melting said bead-like members contained in said molding;

blowing air into said molding to force the melted bead-like members out of said molding;

passing the molding into a high temperature heater; and heating at high temperature said molding sufficiently to form a silicon carbide structure with openings where said bead-like members were initially present before said melting step, such silicon carbide structure then being in the nature of a foamed material.

2. The process of claim 1 further including the steps of:

using low carbon residue bead-like material in said molding process; and utilizing a binder of a phenolic resin to bind said mixture of silicon powder and carbon powder mixed together with a liquid selected from the group consisting of ethanol and methanol for said mixture to be pourable and yet still form said solidified molding during said compressing step.

* * * * *